(12) United States Patent
Stratico et al.

(10) Patent No.: US 6,622,955 B2
(45) Date of Patent: Sep. 23, 2003

(54) WINDER, AND METHODS FOR STRATIFIED WINDING, OF WIRE ONTO A DYNAMO-ELECTRIC CORE

(75) Inventors: Gianfranco Stratico, Siena (IT); Emanuelle Bandinelli, Pelago (IT)

(73) Assignee: Axis USA, Inc., Tampa, FL (US)

( * ) Notice: Subject to any disclaimer, the term of this patent is extended or adjusted under 35 U.S.C. 154(b) by 113 days.

(21) Appl. No.: 09/960,550

(22) Filed: Sep. 20, 2001

(65) Prior Publication Data

US 2002/0066819 A1 Jun. 6, 2002

Related U.S. Application Data

(60) Provisional application No. 60/234,811, filed on Sep. 22, 2000.

(51) Int. Cl.$^7$ ............................................. H02K 15/085
(52) U.S. Cl. ...................................... 242/432.4; 29/596
(58) Field of Search ............................. 242/432, 432.4, 242/432.5, 434; 29/596

(56) References Cited

U.S. PATENT DOCUMENTS

| | | | | |
|---|---|---|---|---|
| 3,822,830 A | * | 7/1974 | Peters | 242/432.5 |
| 4,847,982 A | * | 7/1989 | Morrill | 29/596 |
| 5,273,223 A | * | 12/1993 | Tsugawa | 242/432.4 |
| 6,003,805 A | * | 12/1999 | Newman | 242/432.5 |
| 6,032,897 A | * | 3/2000 | Ponzio | 242/432.4 |
| 6,325,318 B1 | * | 12/2001 | Stratico et al. | 242/433.4 |
| 6,533,208 B1 | * | 3/2003 | Becherucci et al. | 242/432.4 |

* cited by examiner

Primary Examiner—Emmanuel Marcelo
(74) Attorney, Agent, or Firm—Fish & Neave; Joel Weiss; Philip R. Poh

(57) ABSTRACT

A winder for winding wire onto coil supports of dynamo-electric cores with translational, rotational, and stratification motions with respect to a central longitudinal axis of the dynamo-electric core is provided. The rotational motion may preferably be provided by the rocking motion of a gear sector. The stratification motion may preferably be provided by the implementation of a spiral groove. The spiral groove preferably shares the same longitudinal axis as the winder. The rotation of the spiral groove preferably creates a relative motion between the groove and the needles, thereby producing the radial stratification motion of the needles. Additionally, the winder includes a motor arrangement which is programmable and controllable. The motor arrangement may also provide a dampening effect to limit unwanted stratification motion.

24 Claims, 5 Drawing Sheets

WINDER, AND METHODS FOR STRATIFIED WINDING, OF WIRE ONTO A DYNAMO-ELECTRIC CORE

CROSS-REFERENCES TO RELATED APPLICATIONS

This application claims priority from U.S. Provisional Application No. 60/234,811, filed Sep. 22, 2000.

BACKGROUND OF THE INVENTION

The present application relates to winding coils of wire onto poles of dynamo-electric cores. More particularly, the present application relates to an improved method for generating translational, rotational, and stratification motions in the winding of the wires. Stratification motions—i.e., motions that distribute the winding needle in a radial direction—are performed to regularly distribute the turns along the height of a pole in a dynamo-electric component either inwardly toward the center of the core, or outwardly, from the center of the core.

Wire coils for some cores may be wound using wire delivering needles moved in translational and rotational motion. Such motions and the mechanisms for generating them are similar to those described in U.S. Pat. Nos. 4,858,835 and 5,484,114, in U.S. Provisional Patent Application Nos. 60/148,473, filed Aug. 12, 1999, and 60/214,218, filed Jun. 23, 2000, and in U.S. patent application Ser. No. 09/632,281, filed Aug. 4, 2000, all of which are commonly assigned with the present application. Each of the above identified patents are hereby incorporated by reference.

As described in the above-mentioned cases, a winding shaft carries a wire dispensing needle or needles. During winding, the wires are dispensed through the hollow interior of the winding shaft and needle by the relative motion of the shaft with respect to the core. Such motions deliver tensioned wires and wind them around the poles to form the turns of the coil.

In view of the foregoing, it would be desirable to provide a winding apparatus with an improved method for generating rotational and translational movements of the shaft and needle while stratifying the wire along the poles of the dynamo-electric core.

SUMMARY OF THE INVENTION

Therefore, it is an object of the invention to provide a stator core winding apparatus and methods preferably capable of rotational, translational, and stratification movements with respect to the poles of the dynamo-electric core. As mentioned above, this stratification movement may be considered a radial movement that moves the winding needle along the radial extension of the poles. This stratification allows for pre-determined placement of the wire in layered format. Pre-determined placement of the wire in layered format preferably results in deeper and denser winding of wire.

The winder according to the invention preferably includes a plurality of needles. Each needle dispenses a wire. The winder also preferably includes a translation assembly. The translation assembly includes a first member. The first member is preferably a winding shaft which may be substantially hollow. A second member is preferably coupled to the first member. The second member is preferably includes a drive tube and an end tube. The translation assembly is for producing translational movement of the first member and the needle parallel to the longitudinal axis of the winder. The winder also includes a rotation assembly for producing relative rotational movement between the core and the needle about the longitudinal axis. The rotation assembly may include a gear sector which produces a rocking motion, thereby producing the rotational movement.

The winder also includes a stratification assembly moveably coupled to the second member. The stratification assembly causes relative rotational movement between the second member and the first member. This relative rotational movement produces stratification—i.e., radial—movement of the needle.

It should also be noted that the relative rotational movement is substantially independent from the rotational movement produced by the rotation assembly because each of the rotational movements are generated independently of one another. Thus, there are two different mechanisms by which rotation may be accomplished. Furthermore, the stratification assembly preferably includes a spiral groove. The spiral groove preferably shares the same longitudinal axis as the winder. Rotation of the spiral groove with respect to the needles creates relative motion between the groove and the needles. This relative motion causes the stratification motion of the needles.

Additionally, the winder includes a motor arrangement for turning a plurality of gears. The motor arrangement is preferably programmable and controllable with external feed backs such that the rotation imparted to the spiral groove may cause a controlled and predetermined stratification motion. When the motor arrangement is not activated, it may act as a brake to dampen or prevent accidental rotation. Accidental rotations may cause unwanted stratification motion.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
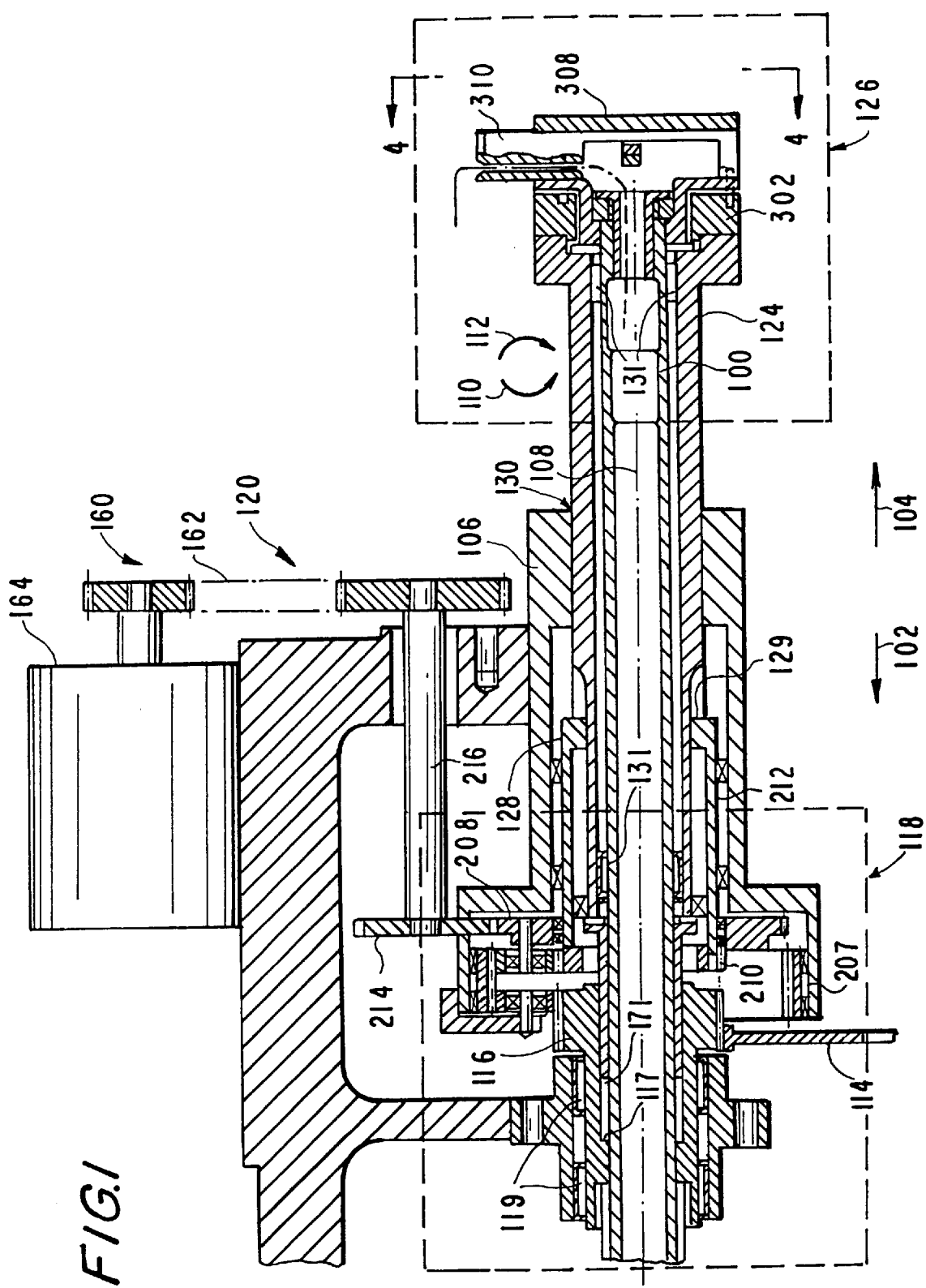
FIG. 1 is a partial sectional view of an embodiment of a winder according to the invention.

As described in the above-mentioned cases, coils are wound around poles by using winding needles. Each needle dispenses wire onto a specific pole. The wire turns of the coils preferably become stratified along the pole. This means that each wire turn tends to occupy an individual layer along the radial axis of a pole. The stratification is such that the turns may be wound on layers progressing outwardly away from the center of the dynamo-electric core—i.e., from longitudinal axis 108 as shown in FIG. 1. Each turn is also preferably wound around the pole sides and across the opposite faces.

To begin winding of the coil, the needles are provided with translation strokes, parallel to the sides of the core and parallel to the plane of the page. (Reference to the "page" as used herein indicates the plane of the drawing page of the FIGURES.). During these translation strokes, the needle tips are partially inserted into the slots of the core to place the wires along the pole sides.

Substantially at the end of the translation strokes, needles can be rotated with respect to longitudinal axis 108 (as shown in FIG. 1) of the core, in order to place the wires across the end faces of the poles. It should be noted that, in an alternative embodiment (not shown), the term rotational movement may indicate that the core may be rotated around axis 108, while the needles remain stationary. At the end of the rotations, the needle tips may be aligned with adjacent slots, where they may start opposite translation strokes.

Such a combination of translational and rotational motions places single turns of coils completely around the poles. The combination of motions needs to be repeated for a number of times equal to the number of turns. Furthermore, the combination of motions also must be repeated for the number of layers of turns that are wound around the poles.

Suitable criteria that may dictate when the needle should be moved along the radii, and how long the increments should be, include the thickness of the wire, the dimensions and winding requirements of the poles, etc. A correctly obtained stratification is of great importance for guaranteeing that the turns are tightly wound, and of the same length. Orderly stratification of the wires achieves more compact coils, which ultimately means that more turns may be wound in the same slot space, while preventing turns of adjacent poles from interfering with each other.

In some embodiments, the invention may provide apparatus and methods for winding wire coils on dynamo-electric components in accordance with the principles of the invention. In some of these embodiments, apparatus according to the invention may include an improved drive method. An improved drive method is disclosed concerning the generation of the needles stratification motion which is performed to regularly distribute the turns along the height of a pole in a dynamo electric component.

Illustrative examples of embodiments in accordance with the principles of the present invention are shown in FIGS. 1–4.

FIG. 1 is a partial cross-sectional view of an apparatus for winding wire with the stratification motion discussed herein (the core has been removed from FIG. 1 for reasons of clarity).

As shown in FIG. 1, winding shaft 100 is driven to move with backwards and forwards translation motions 102 and 104 by a kinematic assembly (not shown) mounted within casing 106. The kinematic assembly, which is well-known in the art, within casing 106 is preferably positioned to the left with respect to the view shown in FIG. 1. Backwards and forwards translation motions 102 and 104 are parallel to axis 108.

Winding shaft 100 is also provided with oscillatory rotation motions 110 and 112. Rotation motions 110 and 112 may be performed about axis 108. Rotation motions 110 and 112 accomplished by winding shaft 100 are preferably implemented in a predetermined time relation or position relation with respect to translation motions 102 and 104.

As regards the stratification motion, a certain increment of stratification motion may be accomplished once winding shaft 100 has completed a sequence of backwards and forwards translational motions 102 and 104 and two opposite rotation motions 110 and 112—i.e., following each completed cycle. This preferably corresponds to the needles having moved once around a respective pole that they are winding in order to form a turn.

Rotational and translation motions and the mechanisms for generating them are similar to those described in commonly-assigned U.S. Pat. Nos. 4,858,835 and 5,484,114, and stratification motions and the mechanisms for generating them are described in commonly-assigned U.S. Provisional Patent Application Nos. 60/148,473, filed Aug. 12, 1999, and 60/214,218, filed Jun. 23, 2000, and in commonly-assigned U.S. patent application Ser. No. 09/632,281, filed Aug. 4, 2000, all of which are hereby incorporated by reference herein in their entireties.

In this embodiment, rotational motions 110 and 112 may be obtained by a rocking motion of winding shaft 100 driven by the rotation of gear wheel 114. Gear wheel 114 is preferably driven by kinematic mechanisms such as those described in the above-cited patents and applications, and discussed above with respect to translation motions. The kinematic assembly may be used to coordinate the translation motions described above and the rotation motions. In the alternative, the kinematic assembly may be used to coordinate the translation motions with the rotation of the core, as described above with respect to the alternative embodiment of the invention.

Figure 2:
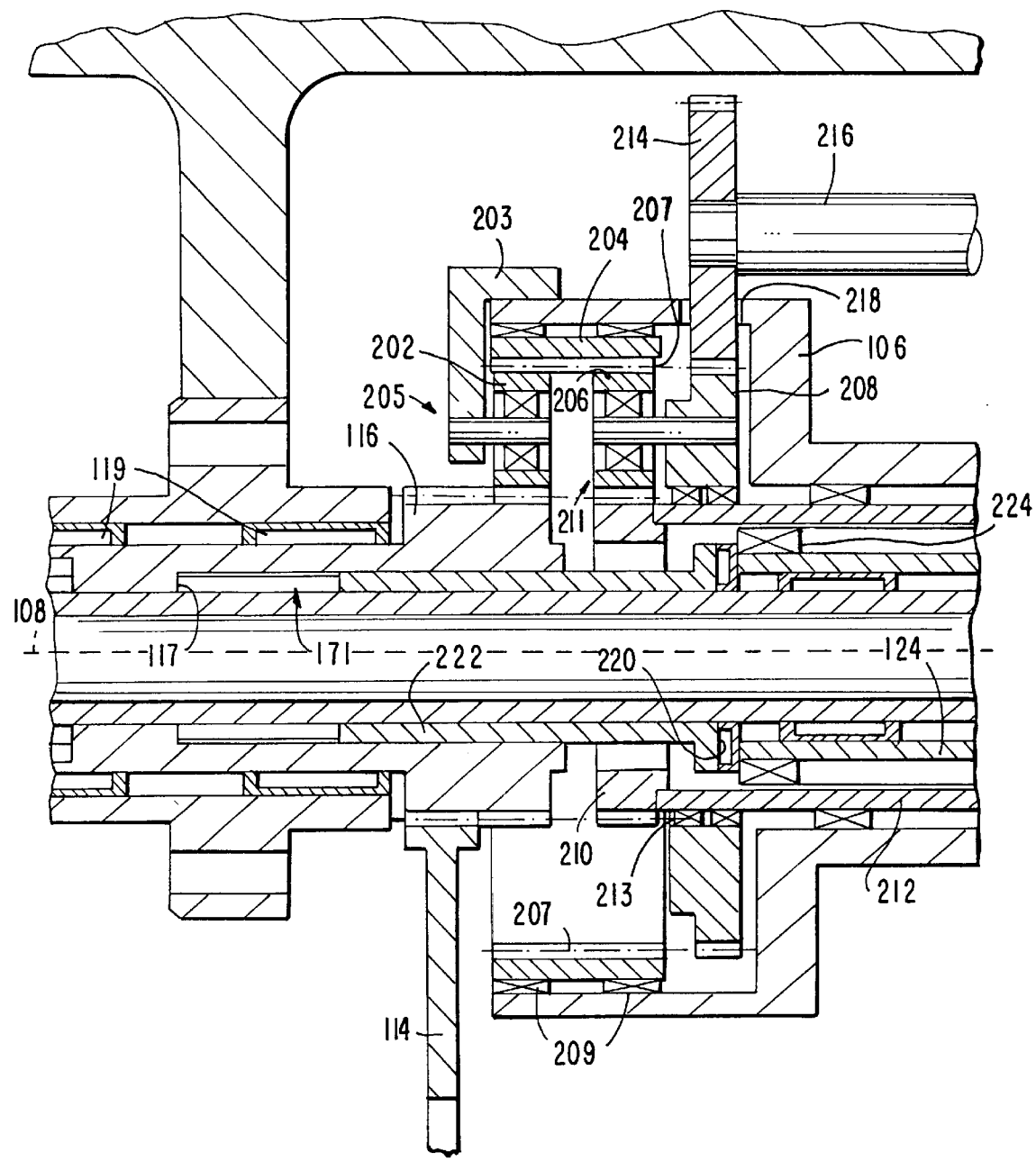
FIG. 2 is a partial sectional view of portion 118 of FIG. 1 according to the invention.

Gear 114 meshes with gear 116. Gear 116 is preferably mounted on bearings 119 (as shown in FIG. 2) of casing 106. The interior portion of gear wheel 116 is preferably hollow and the interior of gear 116 is provided with key 117. Key 117 of gear 116 is received in a keyway 171 of winding shaft 100. Winding shaft 100 passes through the hollow interior portion of gear 116, thereby coaxially assembling gear 116 with winding shaft 100. Consequently, the rotation of gear wheel 116 caused by gear wheel 114 is imparted to winding shaft 100—i.e., in the form of rotation motion 110 and 112. Additionally, it should be noted that winding shaft 100 is also able to accomplish translation motions 102 and 104 as referred to above with respect to U.S. Pat. Nos. 4,858,835 and 5,484,114.

FIG. 2 is a partial cross-sectional view of portion 118 of FIG. 1. As shown in FIG. 2, gear 116 preferably meshes with gear 202. Gear 202 is preferably disposed on bearing shaft arrangement 205. Bearing shaft arrangement 205 may be carried by extension 203 such that it is rigidly connected to casing 106. Gear 202 may also mesh with crown 207 of ring 204. Ring 204 is preferably idle on bearings 209 that are supported by casing 106. In addition to meshing with gear 202, crown 207 also meshes with gear 206. Gear 206 is preferably idle on bearing shaft arrangement 211. It should be noted that bearing shaft arrangement 211 is preferably carried by support gear 208. Gear 206 preferably meshes with gear 210, which is preferably fixed to the rear of drive tube 212.

Drive tube 212, which serves as a drive member for the radial movements of needle 310 as will be explained, is preferably hollow so that it may be assembled coaxially on winding shaft 100 and so that it may contain winding shaft 100 and the wire.

As mentioned above, rotation of gear 114 imparts motions 110 or 112 to winding shaft 100. Rotation of gear 114 causes winding shaft 100 to rotate because of the connection obtained between gear 114 and keyway 171. Winding shaft 100 has key 117 received in gear 116, for transmission of rotations between gear 116 and winding shaft 100.

Gear 208 is preferably mounted on bearings 213. Bearings 213 are preferably supported by drive tube 212. Gear 208 preferably meshes with gear 214, which is mounted on shaft 216.

Motor belt arrangement 120 (as shown in FIG. 1) is preferably mounted on the opposite end of shaft 216. In some embodiments, motor belt arrangement 120 may include a belt wheel 160 driven by a belt 162, which derives motion from a pinion wheel of a motor 164.

Figure 2A:
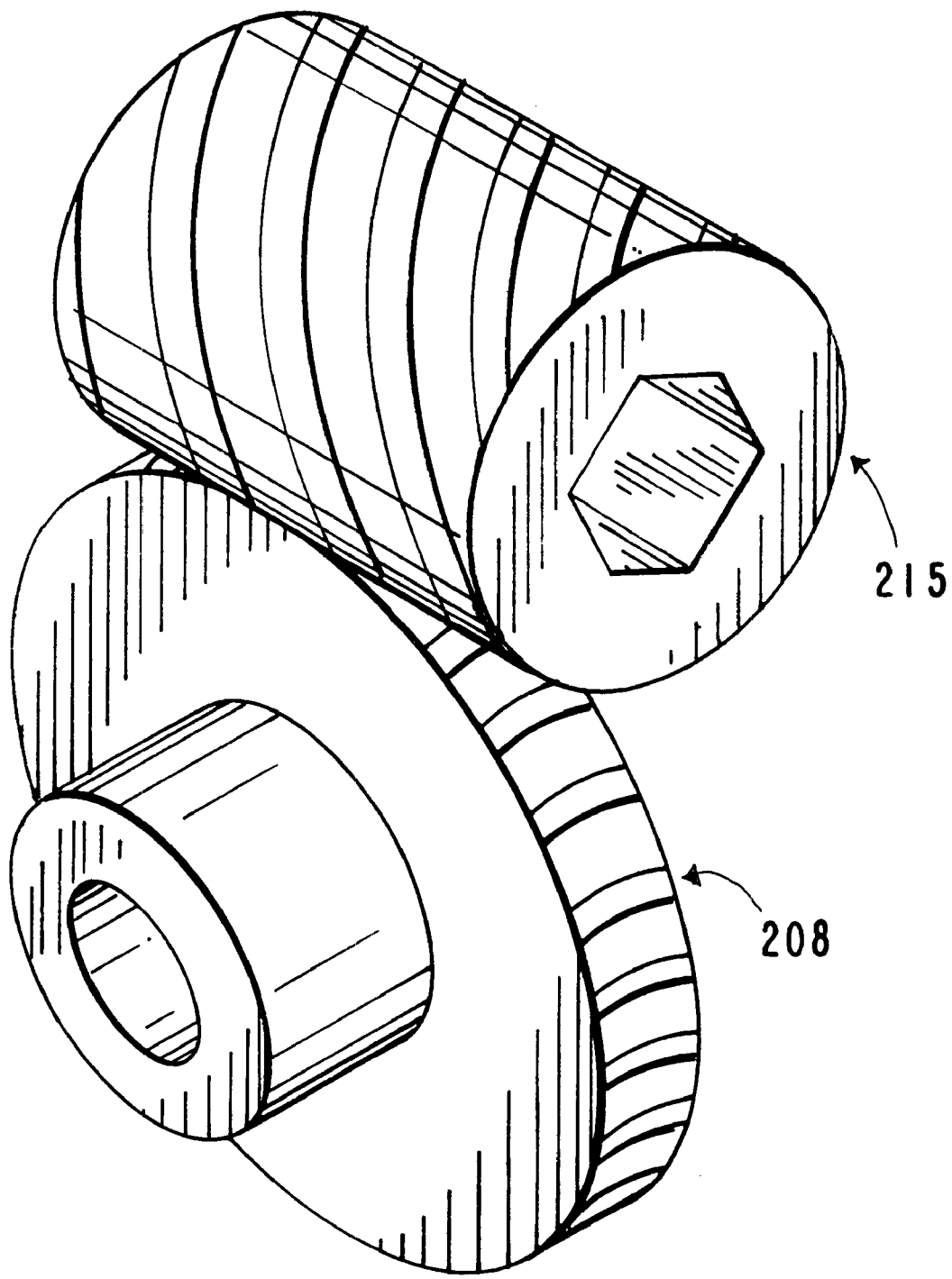
FIG. 2a is a detailed view of a worm gear that can substitute for gear 214 of FIG. 2.

Gear 214 may be substituted with other mechanisms. For example, in some embodiments, gear 214 may be a worm gear 215 as shown in FIG. 2a and described in the following.

As shown in FIGS. 1 and 2, ring 204, crown 207, gear 208, drive tube 212, and gear 210 are coaxial with respect to winding shaft 100 and longitudinal axis 108. Also shown in FIGS. 1 and 2, bearing 213 is supported by drive tube 212.

In an alternative embodiment, bearing 213 may be supported by casing 106. Casing 106 is preferably provided with a cut-out portion 218, thereby allowing gear 214 to mesh with gear 208.

The gear ratios between gear 116 and gear 202, gear 202 and crown 207, crown 207 and gear 206, and gear 208 and gear 210 are such that drive tube 212 preferably rotates in synchronism and for the same amount of rotation—i.e., rotation motions 110 and 112—with respect to the motion imparted on winding shaft 100. As described previously, the motion imparted on winding shaft 100 is caused by the rotation of gear 114. Drive tube 212 is preferably supported on bearings 122 of casing 106, thereby allowing the rotation of drive tube 212. Persons skilled in the art will appreciate that achieving the transmission of rotation motions 110 and 112 to drive tube 212 can be practiced by other than the described embodiments, which are presented for purposes of illustration and not of limitation.

Referring back to FIG. 1, portion 128 of drive tube 212 preferably has angular key portions 129. Key portions 129 are received in a keyway of end tube 124. These keyways are preferably long enough to allow end tube 124 to accomplish translation motions in directions 102 and 104 together with winding shaft 100 while still accommodating key portion 129.

End tube 124 is preferably mounted on bearings 131, which are assembled coaxially with respect to winding shaft 100. Bearings 131 are interposed between winding shaft 100 and end tube 124.

As described above in the summary of the invention, the winder accomplishes an additional rotation motion around axis 108 with respect to winding shaft 100. This additional rotational motion is preferably implemented by causing an additional rotation of end tube 124. This additional rotation motion is additional to the initial rotation motion imparted to drive tube 212 by gear 116 (through gear 202, ring 204, gear 206, crown 207, and bearing shaft arrangement 211 to reach drive tube 212). Thus, end tube 124, which is constrained to move translationally with winding shaft 212 parallel to directions 102 and 104 (as will be explained in more detail below), and which moves rotationally with rotation motions 110 and 112 of winding shaft 100 because of motions generated by gears 114 and 116, is also capable of accomplishing additional relative rotations around axis 108 with respect to winding shaft 100. These additional rotations, which are implemented by gear 214, cause the rotation of drive tube 212 as well as end tube 124.

Figure 3:
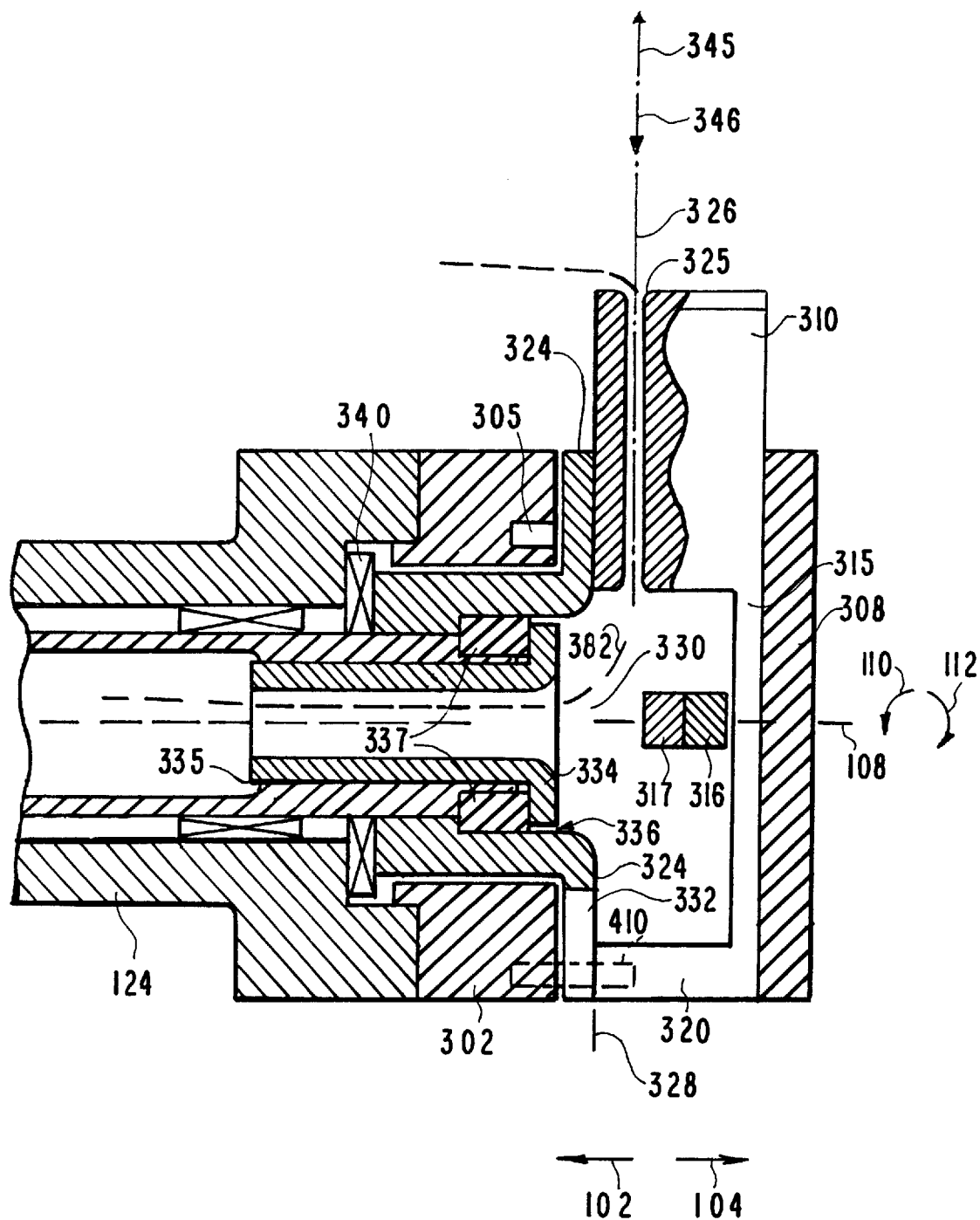
FIG. 3 is a partial sectional view of portion 126 of FIG. 1 according to the invention.
Figure 4:
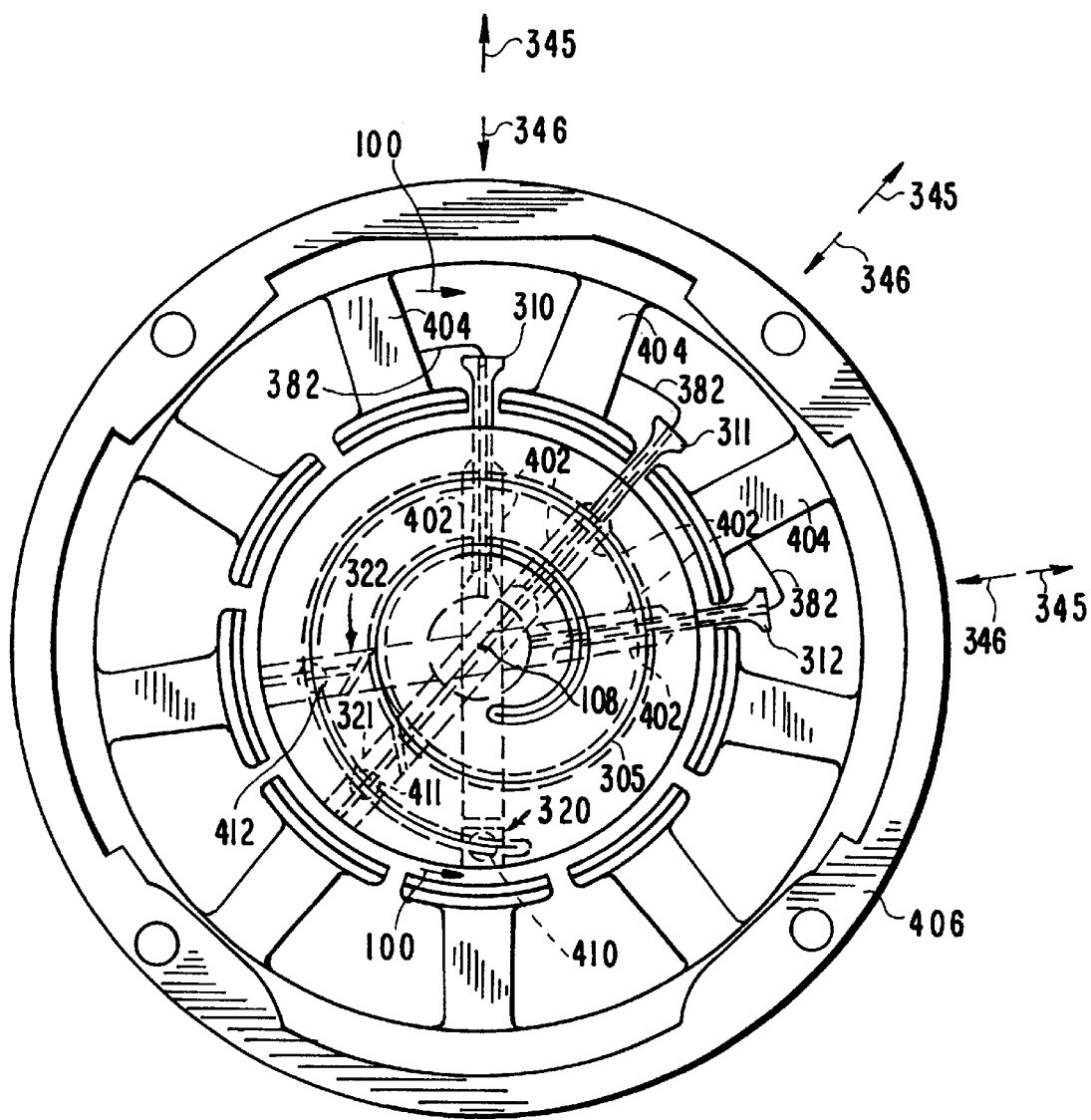
FIG. 4 is an axial view of a core and a partial view of the winder according to the invention taken from lines 4—4 of FIG. 1.

FIG. 3 is an enlargement of portion 126 of FIG. 1. FIG. 4 is a view from directions 4—4 of FIG. 1. FIG. 4 also shows a stator 406 with poles 404 being wound by needles 310, 311, and 312.

As shown in FIG. 3, end tube 124 is preferably flanged. The flange on end tube 124 allows it to be attached to support cylinder 302 by means of bolts (only the axes of the bolts are shown). In this way, support cylinder 302 moves together with end tube 124 both in translation motions 102 and 104 and in rotation motions 110 and 112. Support cylinder 302 is provided with spiral groove 305 (also shown with dashed line representation in FIG. 4). As previously described, end tube 124 is capable of accomplishing additional rotations with respect to winding shaft 100. Consequently, the additional rotation of end tube 124 may cause spiral groove 305 to accomplish the same additional rotation with respect to winding shaft 100.

Guide member 308 (it should be noted that the lead line guide member 308 is shown as connected to the cap of guide member 308) may support a plurality of needles, such as needles 310, 311, and 312 (as shown in FIG. 4). Needles 310, 311, and 312 have main trunk portions 315, 316, and 317, respectively. In the same manner, needles 310, 311, and 312 have distal portions 320, 321, and 322.

The main trunk portions 315, 316, and 317 of needles 310, 311, 312 are received in respective ways of guide member 308. As shown in FIGS. 3 and 4, the sides 402 and bottom 324 of the ways of guide member 308 support the trunk portions and the distal portions of needles 310, 311, and 312. Because the needles are fully supported, the positions of needles 310, 311, and 312 may be maintained even under the action of the applied forces—e.g., the tension of the wire. Furthermore, bottom 324 (shown in FIG. 3) of guide member 308 preferably provides a low-friction surface, thereby allowing the radial stratification movement perpendicular to axis 108 of the needles.

Each needle preferably has a bore—e.g., bore 312 of needle 310. The bores of every needle are preferably in a parallel plane 326 perpendicular to longitudinal axis 108. In the area around longitudinal axis 108, sectors of trunk portions 315, 316, and 317 must be in different planes and cross over each other as shown in FIGS. 3 and 4. Common plane 328 containing the bottom 324 of guide member 308 is nearer to the end of winding shaft 100 than the nearest one of trunk portions 315, 316, and 317 is to the end of winding shaft 100. As shown in FIG. 3, since common plane 328 is nearer to the end of the winding shaft than any one of trunk portions 315, 316, and 317, spacing 330 is left allowing the passage of wire 382 through winding shaft 100 and bore 325.

As shown in FIG. 4, needles 310, 311, and 312 preferably become narrower in trunk portions 315, 316, and 317, respectively, adjacent to the extensions from poles 404, thereby allowing needles 310, 311, and 312 to pass in the space between poles 404. To give needles 310, 311, and 312 substantial strength where they become narrow, the configuration of the needles is extended in a direction parallel to axis 108. The needles may be extended such that the dimension of the needles in the direction parallel to axis 108 is at least twice the narrow dimension of the needles that passes between the poles.

The distal portion of each needle is provided with a respective pin—i.e., pin 410 for needle 310, pin 411 for needle 311, and pin 412 for needle 312—with the extreme portion received within spiral groove 305 to engage the delimiting side walls of spiral groove 305. Guide member 308 is provided with windows 332, thereby allowing the pins 410, 411, and 412 to protrude to spiral groove 305. Spiral groove 305 develops as a spiral from the smallest radius near axis 108, and extends for a predetermined number of turns as shown in FIG. 4. Pins 410, 411, and 412 are each in distinct angular positions with respect to each other in spiral groove 305. Each pin will travel along a respective portion of spiral groove 305. The radius growth of the spiral should be sufficiently gradual to guarantee an unobstructed travel of the pins through spiral groove 305. As will be more fully described in the following, rotation of spiral groove 305 around axis 108 by rotating support cylinder 302 causes spiral groove 305 to move with respect to pins 410, 411, and 412. Consequently, this movement may cause the radial stratification motion of the needles.

It should be noted that the respective portions of spiral groove 305 relating to where the pins travel are preferably long enough to accomplish the radial stratification motions required by the needle or needles.

Bottom 324 of guide member 308 is preferably fixed to winding shaft 100 by means of locking bush 334. Locking bush 334 is preferably threaded to the interior of winding shaft 100 by means of thread 335. Key member 336 (shown in section) preferably has radial arms 337 at equidistant angular positions for engaging in equidistant ways of locking bush 334 and bottom 324 of guide member 308. Portions of key member 336 are two of the radial arms which are received in respective ways of locking bush 334 and guide member 308. By pushing locking bush 334 against key member 336 (through the pull generated by thread 335 and because of the presence of the radial arms), guide member 308 is preferably secure to winding shaft 100. When locking bush 334 is pulled through thread 335, locking bush 334 pushes guide member 308 against axial bearing 340, which is shouldered against end tube 124. This combination causes guide member 308 to move with winding shaft 100 such that the needles preferably accomplish the translation motion parallel to directions 102 and 104 and the rotation motions 110 and 112.

The presence of axial bearing 340 allows the additional rotations of end tube 124 and support cylinder 302 with respect to winding shaft 100 and guide member 308. The push on axial bearing 340 finds a reaction in axial bearing 220. In turn, axial bearing 220 (as shown in FIG. 2) is shouldered by bush 222 (also shown in FIG. 2). The reaction passes through end tube 124 mounted between axial bearings 340 and 220. Bush 222 is shouldered against the extreme of external keyway 171 present on winding shaft 100. In this way, end tube 124 is fixed longitudinally along winding shaft 100 and, therefore, end tube 124 translates longitudinally with winding shaft 100. End tube 124 is able to translate with winding tube 100 (and to rotate with drive tube 212) at least because end tube is supported with respect to casing 106 by bush 130 and with respect to drive tube 212 by bearings 224.

When stratification motion in directions 345 and 346 needs to be imparted to the needles, motor belt unit 120 can be activated causing a required amount of turning of gear 214. This causes the additional rotation described above to end tube 124 by way of gear 208 and drive tube 212. Spiral groove 305 may turn due to this additional rotation and cause movement of pins 410, 411, and 412 in directions 345 and 346. Needles 310, 311, and 312 may move in directions 345 and 346 as a consequence of the movements of the pins in directions 345 and 346. Therefore, end tube 124 and support cylinder 302 (provided with spiral groove 305) may move with the same rotation motions 110 and 112 of winding shaft 100 and may also have an additional rotation (in either of directions 345 and 346 as required) generated by motor drive arrangement (motor belt unit) 120 when the stratification motions of the needles is required.

The motor of belt arrangement 120 is preferably programmable and controllable with external feedbacks so that rotation imparted to the spiral groove 305 (to cause the stratification motion) may occur at predetermined timing or with a predetermined relation to the translational and rotational motions of winding shaft 100.

When motor drive 120 is not activated to cause the additional rotation which causes the stratification motion, it may be implemented to act as a brake to dampen accidental rotation that may be caused to gear 210. Such accidental rotations may cause unwanted stratification motion of the needles in directions 345 and 346.

A motorized worm gear 215 (as shown in FIG. 2a) engaging gear 208 may substitute the motor belt arrangement 120 and gear 214 to achieve the brake action needed to prevent the accidental rotations of gear 208. The tooth characteristics of worm gear 215 would preferably oppose accidental rotations of gear 208.

In conclusion, winding shaft 100 is able to make the needles accomplish the required translational and rotational motions referenced with directions 102, 104, and 110, 112.

Thus, a stator core winding apparatus and methods preferably capable of rotational and translation movements with respect to the poles of the dynamo-electric core is provided. Persons skilled in the art will appreciate that the principles of the present invention can be practices by other than the described embodiments, which are presented for purposes of illustration and not of limitation, and the present invention is limited only by the claims which follow.

What is claimed is:

1. A winder for winding a wire onto a coil support portion of a dynamo-electric core, the winder having a central longitudinal axis, the winder comprising:
   a needle for dispensing the wire;
   a first member;
   a second member;
   a translation assembly that produces translational movement of the first member and the needle parallel to the longitudinal axis;
   a rotation assembly that produces relative rotational movement between the core and the needle; and
   a stratification assembly movably coupled to the second member which causes a relative rotational movement between the second member and the first member, wherein the relative rotational movement between the second member and the first member produces radial movement of the needle and the relative rotational movement between the second member and the first member is independent from the relative rotational movement produced by the rotation assembly.

2. The winder of claim 1, wherein the second member comprises an end tube, the end tube being constrained to move translationally with the first member.

3. The winder of claim 2, wherein the first member comprises a winding shaft, the second member further comprises a drive tube, the end tube being constrained to rotate with the drive tube and wherein the relative rotational movement between the first member and the second member is implemented on the end tube and the drive tube with respect to the winding shaft.

4. The winder of claim 1, wherein the first member comprises a winding shaft.

5. The winder of claim 1, wherein the first member houses a portion of the needle.

6. The winder of claim 1, wherein the translation assembly produces translational movement by a kinematic mechanism.

7. The winder of claim 1, wherein the winder further comprises a plurality of needles.

8. The winder of claim 7, wherein the stratification assembly produces radial movement of each of the plurality of needles substantially simultaneously.

9. The winder of claim 1, the stratification assembly comprising a motor for producing the radial movement.

10. The winder of claim 9, wherein the motor is adapted to provide a dampening effect to limit unwanted radial movement.

11. The winder of claim 1, the stratification assembly comprising a worm gear for producing the relative rotational movement between the second member and the first member.

12. The winder of claim 11, wherein the worm gear is adapted to provide a dampening effect to limit unwanted radial movement.

13. The winder of claim 1, wherein the second member is coaxial with the first member.

14. The winder of claim 1, wherein the first member and the second member share a common longitudinal axis.

15. The winder of claim 1, wherein the translational movement, the relative rotational movement between the core and the needle, and the relative rotational movement between the second member and the first member are programmable.

16. The winder of claim 1, wherein the second member comprises a spiral groove.

17. The winder of claim 16, wherein the relative rotational movement between the first member and the second member is implemented on the spiral groove with respect to the needle.

18. The winder of claim 1, wherein the stratification assembly comprises a guide member for supporting the needle.

19. The winder of claim 1, the needle comprising a first dimension parallel to the longitudinal axis and a second dimension perpendicular to the longitudinal axis, the second dimension for allowing the needle to pass between two poles of the dynamo-electric core, wherein the first dimension is at least twice the thickness of the second dimension.

20. The winder of claim 1, further comprising a gear transmission, and wherein the rotation assembly is coupled by the gear transmission to at least one of the first member and the second member.

21. The winder of claim 20, wherein the gear transmission is hollow, and wherein at least one of the first member and the second member are circumferentially surrounded by the gear transmission.

22. The winder of claim 1, wherein the rotation assembly is adapted to rotate the core about the longitudinal axis.

23. The winder of claim 1, wherein the rotation assembly is adapted to rotate the second member and the needle about the longitudinal axis.

24. A method for winding a wire onto a coil support portion of a dynamo-electric core using a winder having a central longitudinal axis, a first member and a second member, the method comprising:

winding the wire along the coil support in a direction parallel to the longitudinal axis;

winding the wire across a face of the coil support in a first rotational direction about the longitudinal axis;

winding the wire along the coil support opposite the parallel direction;

winding the wire across a second face of the coil support in a second rotational direction about the longitudinal axis, the second rotational direction being opposite the first rotational direction; and stratifying the wire along the coil support in a radial direction perpendicular to the longitudinal axis by generating relative rotational movement between the first member and the second member independently of winding the wire across the first and second face.

* * * * *